(12) United States Patent
Fu et al.

(10) Patent No.: US 10,314,016 B2
(45) Date of Patent: Jun. 4, 2019

(54) METHOD AND APPARATUS FOR HARQ-ACK TRANSMISSION IN TRAFFIC ADAPTIVE TDD SYSTEM

(71) Applicant: Samsung Electronics Co., Ltd., Gyeonggi-do (KR)

(72) Inventors: Jingxing Fu, Beijing (CN); Chengjun Sun, Beijing (CN); Yingyang Li, Beijing (CN)

(73) Assignee: Samsung Electronics Co., Ltd (KR)

( * ) Notice: Subject to any disclaimer, the term of this patent is extended or adjusted under 35 U.S.C. 154(b) by 142 days.

(21) Appl. No.: 14/417,294

(22) PCT Filed: Jul. 26, 2013

(86) PCT No.: PCT/KR2013/006750
§ 371 (c)(1),
(2) Date: Jan. 26, 2015

(87) PCT Pub. No.: WO2014/017877
PCT Pub. Date: Jan. 30, 2014

(65) Prior Publication Data
US 2015/0173065 A1    Jun. 18, 2015

(30) Foreign Application Priority Data
Jul. 26, 2012  (CN) .......................... 2012 1 0262044

(51) Int. Cl.
*H04W 72/04* (2009.01)
*H04L 5/00* (2006.01)
(Continued)

(52) U.S. Cl.
CPC ....... *H04W 72/0413* (2013.01); *H04L 1/1861* (2013.01); *H04L 5/0055* (2013.01); *H04L 5/14* (2013.01)

(58) Field of Classification Search
CPC ....... H04L 1/1861; H04L 5/0055; H04L 5/14; H04W 72/0413
See application file for complete search history.

(56) References Cited

U.S. PATENT DOCUMENTS

2007/0245202 A1   10/2007   Kim et al.
2009/0257388 A1   10/2009   Khandekar et al.
(Continued)

FOREIGN PATENT DOCUMENTS

JP   2006-319715      11/2006
KR   10-2012-0018040   2/2012

OTHER PUBLICATIONS

PCT/ISA/210 Search Report dated PCT/KR2013/006750 (pp. 3).
PCT/ISA/237 Written Opinion dated PCT/KR2013/006750 (pp. 4).

*Primary Examiner* — Andrew Lai
*Assistant Examiner* — M Mostazir Rahman
(74) *Attorney, Agent, or Firm* — The Farrell Law Firm, P.C.

(57) ABSTRACT

A method and an apparatus are provided for HARQ-ACK feedback information transmission in a traffic adaptive TDD system. The method includes receiving, by a User Equipment (UE), a System Information Block (SIB); obtaining, by the UE, a TDD uplink and downlink configuration that is indicated by current system information and does not support traffic adaptive UE, from the SIB; identifying, by the UE, implicit resources of Physical Uplink Control Channel (PUCCH) based on the TDD uplink and downlink configuration; obtaining, by the UE, a HARQ-ACK timing that supports a traffic adaptive UE; and transmitting, by the UE, the HARQ-ACK feedback information on determined PUCCH resources using a determined PUCCH format, based on the obtained HARQ-ACK timing.

16 Claims, 13 Drawing Sheets

(51) Int. Cl.
  *H04L 1/18*  (2006.01)
  *H04L 5/14*  (2006.01)

(56) References Cited

U.S. PATENT DOCUMENTS

| | | | |
|---|---|---|---|
| 2012/0044889 A1 | 2/2012 | Jen | |
| 2012/0155337 A1* | 6/2012 | Park | H04L 1/1692 370/280 |
| 2012/0236812 A1* | 9/2012 | Chen | H04L 1/1685 370/329 |
| 2012/0294204 A1* | 11/2012 | Chen | H04L 1/1812 370/280 |
| 2013/0201841 A1* | 8/2013 | Zhang | H04L 1/1607 370/252 |
| 2013/0301433 A1* | 11/2013 | Yin | H04W 16/02 370/252 |

\* cited by examiner

METHOD AND APPARATUS FOR HARQ-ACK TRANSMISSION IN TRAFFIC ADAPTIVE TDD SYSTEM

PRIORITY

This application is a National Stage application for International Application No. PCT/KR2013/006750, which was filed Jul. 26, 2013, and claims priority to Chinese Patent Application No. 201210262044.2, which was filed in the State Intellectual Property Office on Jul. 26, 2012, the content of each of which is incorporated herein by reference.

BACKGROUND OF THE INVENTION

1. Field of the Invention

The present invention relates generally to radio communication technologies, and more particularly, to a method and an apparatus for transmitting a Hybrid Automatic Repeat reQuest-Acknowledgement (HARQ-ACK) of a Physical Downlink Shared Channel (PDSCH) in a traffic adaptive Time Division Duplexing (TDD) system when a TDD uplink and downlink configuration of a cell dynamically changes with uplink and downlink traffic.

2. Description of the Related Art

Long Term Evolution (LTE) technology supports a Frequency Division Duplexing (FDD) mode and a TDD mode.

FIG. 1 illustrates a frame structure in an LTE TDD system.

In the LTE TDD system, the length of each radio frame is 10 ms, and each radio frame is divided into two 5 ms half frames. Each half frame includes 8 0.5 ms time slots and 3 1 ms special domains. The 3 special domains include a Downlink Pilot Time Slot (DwPTS), a Guard Partition (GP) and an Uplink Pilot Time Slot (UpPTS), and each subframe includes two continuous time slots.

The transmissions in the TDD system include transmissions from a base station to a User Equipment (UE), i.e., downlink transmissions, and transmissions from the UE to the base station, i.e., uplink transmissions. According to the frame structure illustrated in FIG. 1, the uplink transmission and the downlink transmission in each 10 ms period share 10 subframes, and each subframe is assigned to the uplink transmission or the downlink transmission. The subframe assigned to the uplink transmission is referred to as an uplink subframe, and the subframe assigned to the downlink transmission is referred to as a downlink subframe.

The TDD system supports 7 types of uplink and downlink configurations, as shown in Table 1 below. In Table 1, "D" indicates downlink subframes, "U" indicates uplink subframes, and "S" indicates special subframes including the above-described 3 special domains.

TABLE 1

| TDD UL/DL configuration index | switching point period | \multicolumn{10}{c}{subframe index} | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

In order to increase the transmission rate of users, a newer version LTE TDD system has been proposed, which has the same HARQ transmission timing as the older LTE TDD system.

Specifically, the HARQ-ACK of PDSCH may be transmitted in a Physical Uplink Shared Channel (PUSCH) and a Physical Uplink Control Channel (PUCCH). For a timing from the PDSCH to the PUCCH, for example, the UE transmits the HARQ-ACK in the PUCCH of uplink subframe n, the PUCCH indicates the PDSCH in downlink subframe n−k and the HARQ-ACK released by Semi-Persistent Scheduling (SPS), where k∈K. The value of K is defined in Table 2 below, and K is a set of M elements, represented as $\{k_0, k_1, \ldots k_{M-1}\}$. Further, K relates to the serial number of a subframe and TDD uplink and downlink, and is referred to as a downlink association set. An element k is referred to as a downlink association element.

Hereinafter, downlink subframes corresponding to the downlink association set are referred to as a bundling window, i.e., for all k elements in K, the downlink subframes are a set {n−k, k∈K} composed of n−k elements. In a PUCCH subframe, each PDSCH of each downlink subframe is assigned PUCCH resources for transmitting the HARQ-ACK.

TABLE 2

| TDD UL/DL configuration index | subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

With the increasing requirements for data transmission rates, a traffic adaptive TDD technology has been proposed in the newer LTE version. By dynamically adjusting the ratio between uplink subframes and downlink subframes, the current uplink and downlink configuration more accords with the ratio between the current uplink traffic and downlink traffic, thereby improving the uplink and downlink peak rate of users and system throughput.

In the traffic adaptive TDD system, a TDD uplink and downlink configuration followed by the HARQ-ACK timing from the PDSCH to the PUCCH may be different from an actual TDD uplink and downlink configuration. For example, high-layer signaling or physical layer signaling may indicate a reference TDD uplink and downlink configuration, and whatever the actual TDD uplink and downlink configuration is, the HARQ-ACK of the PDSCH is transmitted according to the HARQ-ACK timing corresponding to the reference TDD uplink and downlink configuration indicated by the high-layer signaling or the physical layer signaling. For example, if the indicated reference TDD uplink and downlink configuration is TDD uplink and downlink configuration 2 and the actual TDD uplink and downlink configuration is TDD uplink and downlink configuration 0, 1, or 6, because downlink subframes of the actual TDD uplink and downlink configuration are a subset of downlink subframes of the reference TDD uplink and downlink configuration, all downlink subframes of the actual TDD uplink and downlink configuration may obtain uplink subframes for transmitting the HARQ-ACK of the PDSCH.

In an actual system, newer LTE version UEs and older UEs coexist. For the HARQ-ACK timing from the PDSCH to the PUCCH, the older UEs and the newer UEs may follow different TDD uplink and downlink configurations. For different TDD uplink and downlink configurations, when the HARQ-ACK of the downlink data is transmitted on the same one uplink subframe, there are different bundling windows, as illustrated in FIG. 2.

Referring to FIG. 2, letters "D" and "S" in subframes indicate downlinks subframes, and letter "U" indicates downlink subframes.

The newer UE transmits the HARQ-ACK of the PDSCH according to the HARQ-ACK timing of TDD uplink and downlink configuration 2, where the TDD uplink and downlink configuration used by the newer UE is the reference TDD uplink and downlink configuration indicated by the high-layer signaling or the physical layer signaling. The older UE uses the HARQ-ACK timing of TDD uplink and downlink configuration 0, where the TDD uplink and downlink configuration used by the older UE is a TDD uplink and downlink configuration indicated in system information (e.g., a System Information Block 1 (SIB1)) by a TDD UE that does not support adaptive traffic. When the newer UE and the older UE transmit the HARQ-ACK of PDSCH on the same uplink subframe 2 according to respective HARQ-ACK timings, the newer UE transmits the HARQ-ACK of downlink subframes 4, 5, 6, and 8, and the older UE transmits the HARQ-ACK of downlink subframe 6.

To transmit the HARQ-ACK of downlink subframes 4, 5, 6, and 8 corresponding to the newer UE, the downlink subframe 6 corresponding to the older UE has PUCCH format 1a/1b resources on the uplink subframe 2, and the downlink subframes 4, 5, and 8 have no PUCCH format 1a/1b resources on the uplink subframe 2. The PUCCH format 1a/1b resources are obtained according to the smallest Control Channel Element (CCE) index for scheduling the PDCCH.

For the newer UE, if PUCCH resources are reserved for each downlink subframe according to conventional technologies, because the number of downlink subframes in the reference TDD uplink and downlink configuration indicated by the high-layer signaling or the physical layer signaling is larger than the number of downlink subframes actually configured, not all of the PUCCH resources are actually needed, thereby wasting the PUCCH resources.

Accordingly, when the HARQ-ACK of the PDSCH in the traffic adaptive TDD system is transmitted, there is a problem how the newer UE is compatible with the older UE and a problem that the PUCCH resources are wasted in the prior art.

SUMMARY OF THE INVENTION

Accordingly, the present invention is designed to address at least the problems and/or disadvantages described above and to provide at least the advantages described below.

Accordingly, an aspect of the present invention is to provide a HARQ-ACK transmission method and apparatus in a traffic adaptive TDD system, which makes a newer UE compatible with an older UE, and addresses PUCCH resource waste.

In accordance with an aspect of the present invention, a method is provided for transmitting HARQ-ACK feedback information in a traffic adaptive TDD system. The method includes receiving, by a User Equipment (UE), a System Information Block (SIB); obtaining, by the UE, a TDD uplink and downlink configuration that is indicated by current system information and does not support traffic adaptive UE, from the SIB; identifying, by the UE, implicit resources of Physical Uplink Control Channel (PUCCH) based on the TDD uplink and downlink configuration; obtaining, by the UE, a HARQ-ACK timing that supports a traffic adaptive UE; and transmitting, by the UE, the HARQ-ACK feedback information on determined PUCCH resources using a determined PUCCH format, based on the obtained HARQ-ACK timing.

In accordance with another aspect of the present invention, an apparatus is provided for transmitting HARQ-ACK feedback information in a traffic adaptive TDD system. The apparatus includes a receiver configured to receive a System Information Block (SIB); a controller configured to obtain a TDD uplink and downlink configuration that is indicated by current system information and does not support traffic adaptive UE, based on the SIB, to identify implicit resources of a Physical Uplink Control Channel (PUCCH), based on the TDD uplink and downlink configuration, and to obtain a HARQ-ACK timing that supports a traffic adaptive UE; and a transmitter configured to transmit the HARQ-ACK feedback information on determined PUCCH resources using a determined PUCCH format, based on the obtained HARQ-ACK timing.

In accordance with another aspect of the present invention, a method is provided for receiving HARQ-ACK feedback information in a traffic adaptive TDD system. The apparatus includes obtaining, by a base station (BS), a HARQ-ACK timing that supports a traffic adaptive UE; transmitting, by the BS, a System Information Block (SIB); obtaining, by the BS, a TDD uplink and downlink configuration that is indicated by current system information and does not support the traffic adaptive UE; identifying, by the BS, implicit resources of Physical Uplink Control Channel (PUCCH), based on the TDD uplink and downlink configuration; and receiving, by the BS, the HARQ-ACK feedback information on determined PUCCH resources using a determined PUCCH format, based on the obtained HARQ-ACK timing.

In accordance with another aspect of the present invention, an apparatus is provided for receiving HARQ-ACK feedback information in a traffic adaptive TDD system. The apparatus includes a controller configured to obtain a HARQ-ACK timing supporting a traffic adaptive UE, obtain a TDD uplink and downlink configuration that is indicated by current system information and does not support the traffic adaptive UE, and identify implicit resources of a Physical Uplink Control Channel (PUCCH), based on the TDD uplink and downlink configuration; a transmitter configured to transmit a System Information Block (SIB); and a receiver configured to receive the HARQ-ACK feedback information on determined PUCCH resources using a determined PUCCH format, based on the obtained HARQ-ACK timing.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

The concept of PUCCH implicit resources is illustrated herein. In LTE Release8, for a PDSCH scheduled by a PDCCH on a downlink subframe, the HARQ-ACK of the PDSCH is transmitted on corresponding uplink subframes. The PUCCH format 1a/1b resources for transmitting the HARQ-ACK are obtained through scheduling the PDCCH of the PDSCH, i.e., the PUCCH format 1a/1b resources are obtained according to the lowest CCE index of the PDCCH. Herein, the PUCCH format 1a/1b resources obtained according to the lowest CCE index of the PDCCH are referred to as implicit resources.

Figure 1:
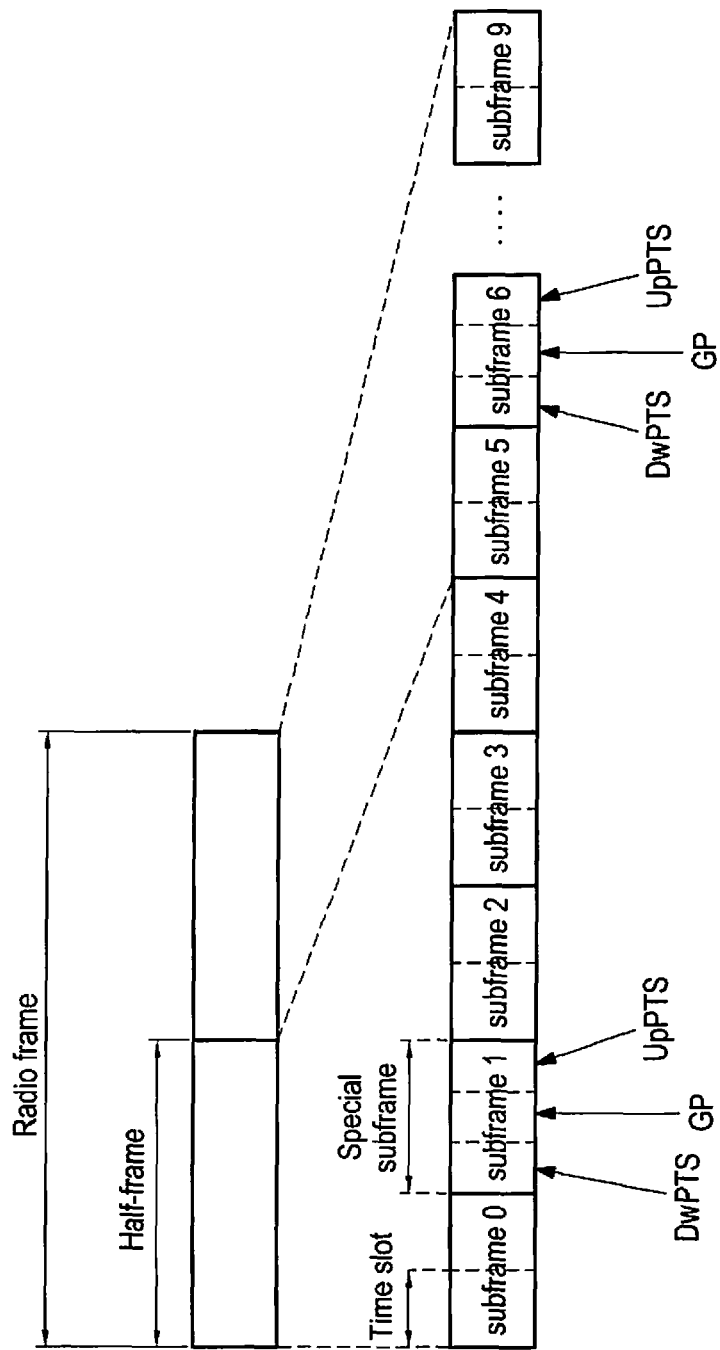
FIG. 1 illustrates a conventional frame structure in an LTE TDD system.
Figure 2:
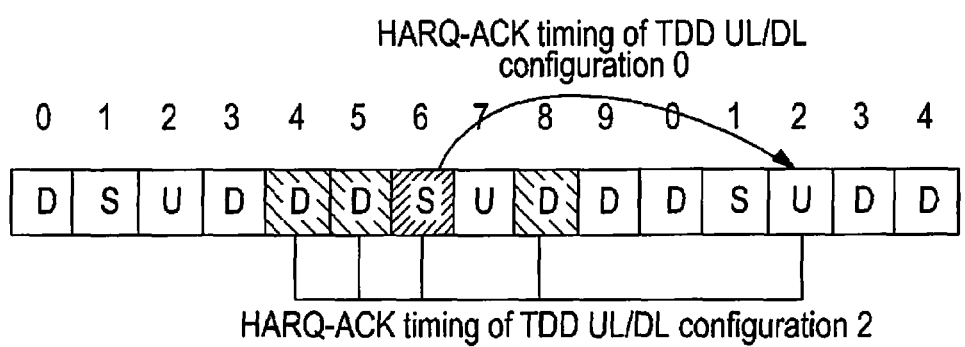
FIG. 2 is a schematic diagram illustrating problems in the conventional art.
Figure 3:
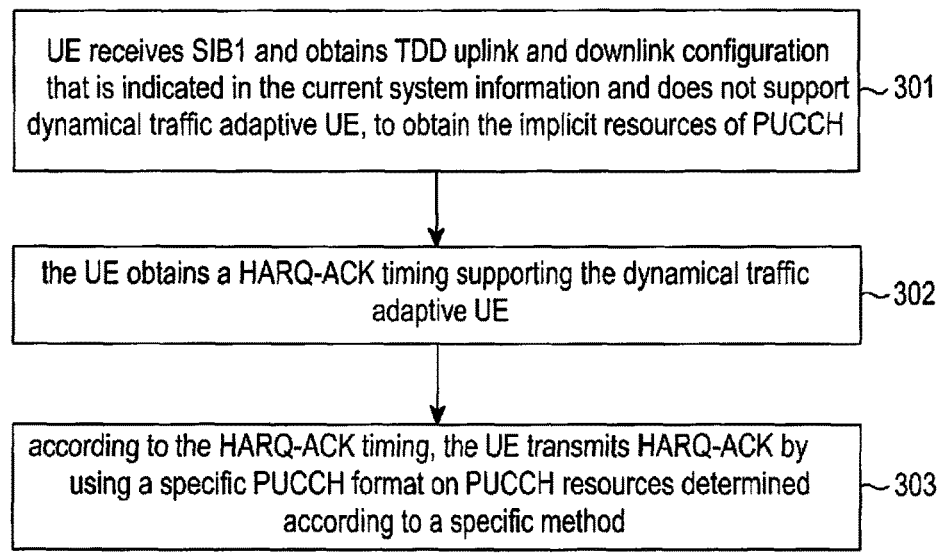
FIG. 3 is a flowchart illustrating a HARQ-ACK transmission method in a traffic adaptive TDD system according to an embodiment of the present invention.

FIG. 3 is a flowchart illustrating a HARQ-ACK transmission method in a traffic adaptive TDD system according to an embodiment of the present invention.

Referring to FIG. 3, in step 301, a UE receives SIB1 and obtains a TDD uplink and downlink configuration to obtain the implicit resources of the PUCCH. The TDD uplink and downlink configuration is indicated in the current system information and does not support a dynamic traffic adaptive UE. That is, in step 301, the UE can obtain the implicit resources of the PUCCH according to the TDD uplink and downlink configuration that does not support the dynamic traffic adaptive UE.

In step 302, the UE obtains a HARQ-ACK timing that supports the dynamic traffic adaptive UE. For example, through receiving high-layer signaling, the UE may obtain the HARQ-ACK timing supporting the dynamic traffic adaptive UE.

In step 303, according to the HARQ-ACK timing, the UE transmits the HARQ-ACK using a specific PUCCH format on PUCCH resources determined according to a specific method.

Various methods of determining the PUCCH resources and PUCCH format used for the HARQ-ACK transmission in step 303 are described hereinbelow.

In accordance with an embodiment of the present invention, a Transmit Power Control (TPC) element in a PDCCH that schedules a PDSCH on all downlink subframes in a HARQ-ACK bundling window are all used as HARQ-ACK Resource Indicators (ARIs), which indicate PUCCH format 3 resources for transmitting the HARQ-ACK for the UE, the UE transmits the HARQ-ACK on the PUCCH format 3 resources indicated by the ARIs, and a power control command of PUCCH format 3/3A is used to implement the power control of the PUCCH transmitting the HARQ-ACK.

The TDD uplink and downlink configuration 1 is indicated by the current system information obtained by the UE from the SIB1 and does not support the dynamic traffic adaptive UE, the TDD uplink and downlink configuration 2 used by the HARQ-ACK timing is obtained by the UE through receiving the high-layer signaling and supports the dynamic traffic adaptive UE, and the TPC element in the PDCCH that schedules the PDSCH on downlink subframes 4, 5, 6, and 8 in the HARQ-ACK bundling window transmitting the HARQ-ACK on uplink subframe 2 are all used as ARIs, which indicates the PUCCH format 3 resources for transmitting the HARQ-ACK.

Figure 4:
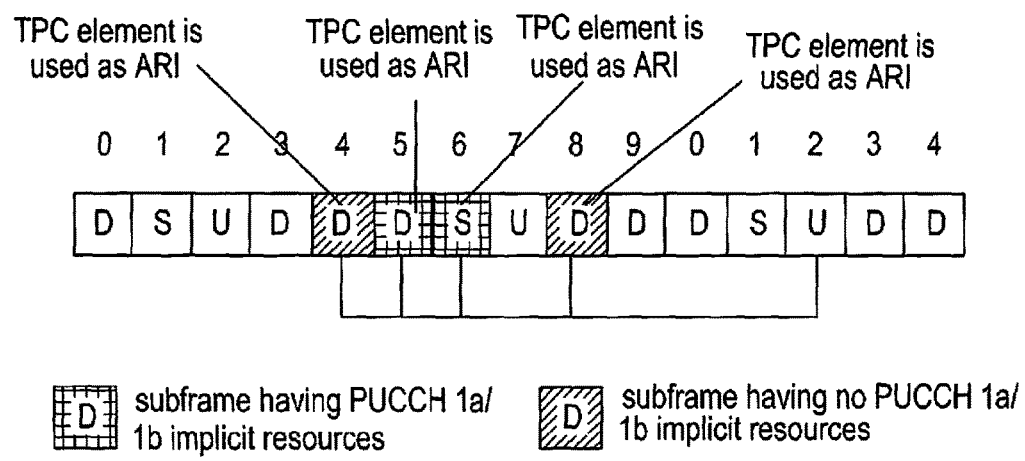
FIG. 4 illustrates a method for obtaining resources and a format used for HARQ-ACK transmission according to an embodiment of the present invention.

When the UE receives the PDCCH from at least one of the downlink subframes 4, 5, 6, and 8, the TPC element in the PDCCH are all used as the ARIs. That is, when the UE receives the PDCCH from at least one of the downlink subframes 4, 5, 6, and 8, the PUCCH format 3 resources indicated by the ARIs in the PDCCH are used to transmit the HARQ-ACK, as illustrated in FIG. 4.

In accordance with another embodiment of the present invention, when a downlink subframe whose Downlink Assignment Index (DAI) is equal to 1 in the HARQ-ACK bundling window has implicit resources, the TPC element in the PDCCH on the downlink subframe is used as a TPC command, which is taken as a power control command of the PUCCH transmitting the HARQ-ACK. Besides, the TPC element in the PDCCH on other downlink subframes are used as the ARIs, which indicates the PUCCH format 3 resources for transmitting the HARQ-ACK. Further, when the UE only receives the PDCCH of downlink subframe whose DAI is equal to 1 and the downlink subframe has implicit resources, the UE transmits the HARQ-ACK on the implicit resources by using PUCCH format 1a/1b. If the downlink subframe has no implicit resources, the UE transmits the HARQ-ACK by using PUCCH format 3 on the PUCCH format 3 resources obtained according to the ARI in the PDCCH. When the UE receives the PDCCH of downlink subframe whose DAI is unequal to 1, the UE transmits the HARQ-ACK by using the PUCCH format 3 on the PUCCH format 3 resources obtained according to the ARI in the PDCCH.

Figure 5:
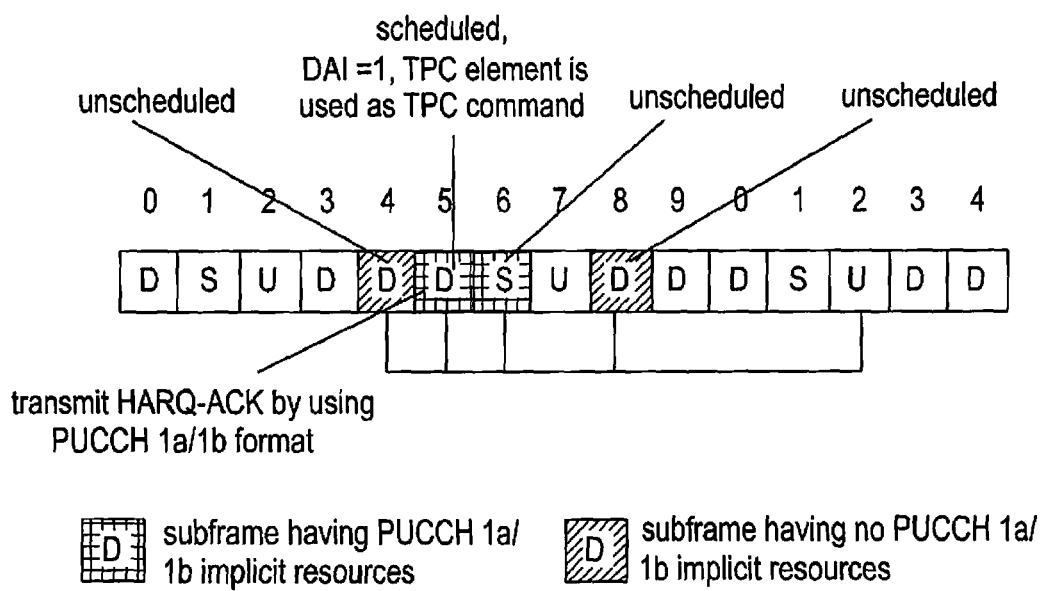
FIG. 5 illustrates a method for obtaining resources and a format used for HARQ-ACK transmission according to an embodiment of the present invention.

The TDD uplink and downlink configuration 1 is indicated by the current system information obtained by the UE from the SIB1 and does not support the dynamic traffic adaptive UE, and the TDD uplink and downlink configuration 2 used by the HARQ-ACK timing is obtained by the UE through receiving the high-layer signaling and supports the dynamic traffic adaptive UE. If the PDCCH scheduling the PDSCH is detected only on the downlink subframe 5 and the DAI in the PDCCH is equal to 1, according to the TDD uplink and downlink configuration 1 that does not support the dynamical traffic adaptive UE, the downlink subframe 5 has implicit resources on the uplink subframe 2. The TPC element in the PDCCH on the downlink subframe 5 is used as a TPC command, and the HARQ-ACK is transmitted on the implicit resources of the downlink subframe 5 by using the PUCCH format 1a/1b, as illustrated in FIG. 5.

In accordance with another embodiment of the present invention, the UE obtains the PUCCH format 1a/1b resource corresponding to each bundling window through the high-layer signaling, the TPC element in the PDCCH on the downlink subframes whose DAI is unequal to 1 are used as the ARIs, which indicates the PUCCH format 3 resources for transmitting the HARQ-ACK. The TPC element in the PDCCH on the downlink subframes whose DAI is equal to 1 are used as a power control command of PUCCH transmitting the HARQ-ACK. Further, when the UE only receives the PDCCH of downlink subframe whose DAI is equal to 1, the UE transmits the HARQ-ACK by using the PUCCH format 1a/1b on the PUCCH format 1a/1b resources obtained according to the high-layer signaling, and when the UE receives the PDCCH of downlink subframe whose DAI is unequal to 1, the UE transmits the HARQ-ACK by using the PUCCH format 3 on the PUCCH format 3 resources obtained according to the ARIs in the PDCCH.

Figure 6:
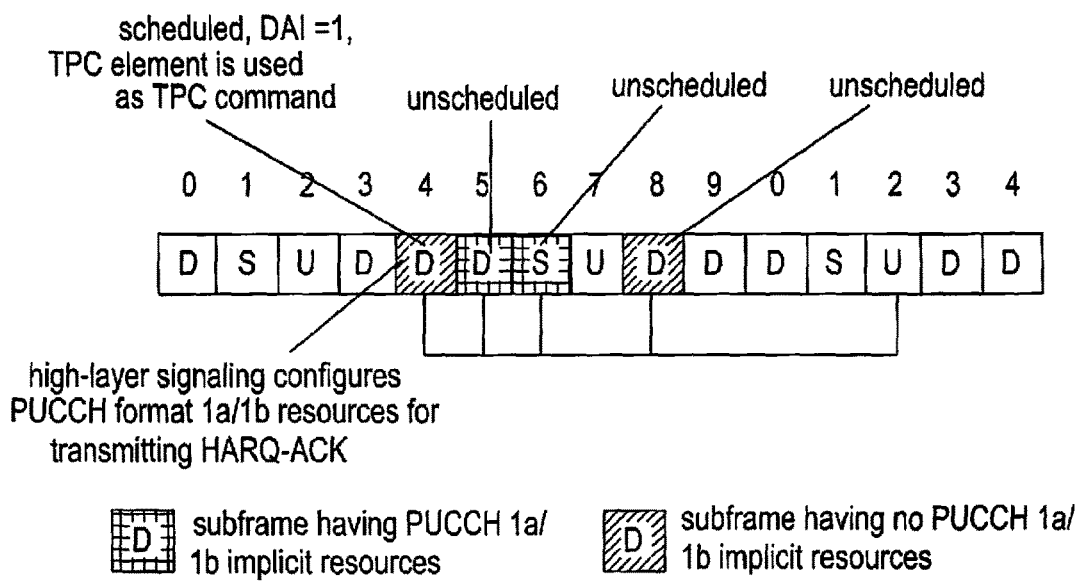
FIG. 6 illustrates a method for obtaining resources and a format used for HARQ-ACK transmission according to an embodiment of the present invention.

The TDD uplink and downlink configuration 1 is indicated by the current system information obtained by the UE from the SIB1 and does not support the dynamic traffic adaptive UE, and the TDD uplink and downlink configuration 2 is used by the HARQ-ACK timing that is obtained by the UE through receiving the high-layer signaling and supports the dynamic traffic adaptive UE. If the PDCCH scheduling the PDSCH is detected only on the downlink subframe 4 and the DAI in the PDCCH is equal to 1, according to the TDD uplink and downlink configuration 1 that does not support the dynamical traffic adaptive UE, the TPC element in the PDCCH on the downlink subframe 4 is used as a TPC command, and the HARQ-ACK is transmitted by using the PUCCH format 1a/1b on the PUCCH format 1a/1b resources obtained according to the high-layer signaling, as illustrated in FIG. 6.

In accordance with another embodiment of the present invention, the UE obtains the PUCCH format 1a/1b resource corresponding to each bundling window through the high-layer signaling, the TPC element in the PDCCH on the downlink subframes whose DAI is unequal to 1 are used as the ARIs, which indicate the PUCCH format 3 resources for transmitting the HARQ-ACK, and the TPC element in the PDCCH on the downlink subframes whose DAI is equal to 1 are used as a power control command of the PUCCH transmitting the HARQ-ACK. Further, when the UE only receives the PDCCH of downlink subframe whose DAI is equal to 1, and the downlink subframe has implicit resources, the UE transmits the HARQ-ACK on the implicit resources by using the PUCCH format 1a/1b. If the downlink subframe has no implicit resources, the UE transmits the HARQ-ACK by using the PUCCH format 1a/1b on the PUCCH format 1a/1b resources obtained according to the high-layer signaling. When the UE receives the PDCCH of downlink subframe whose DAI is unequal to 1, the UE transmits the HARQ-ACK by using the PUCCH format 3 on the PUCCH format 3 resources obtained according to the ARIs in the PDCCH.

The TDD uplink and downlink configuration 1 is indicated by the current system information obtained by the UE from the SIB1 and does not support the dynamic traffic adaptive UE, and the TDD uplink and downlink configuration 2 is used by the HARQ-ACK timing that is obtained by the UE through receiving the high-layer signaling and supports the dynamic traffic adaptive UE.

Figure 7:
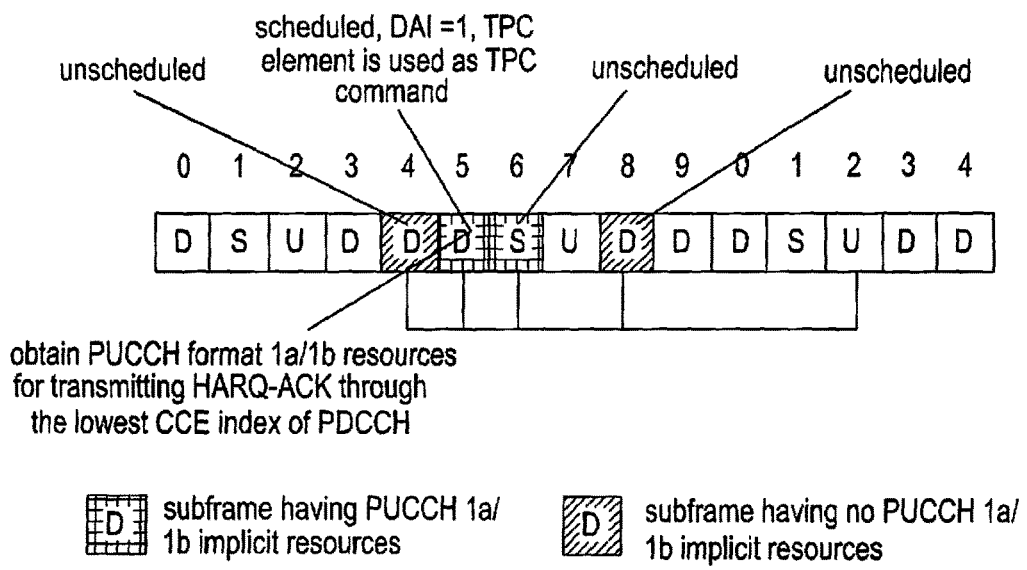
FIG. 7 illustrates a method for obtaining resources and a format used for HARQ-ACK transmission according to an embodiment of the present invention.

If the PDCCH scheduling the PDSCH is detected only on the downlink subframe 5 and the DAI in the PDCCH is equal to 1, according to the TDD uplink and downlink configuration 1 that does not support the dynamical traffic adaptive UE, the downlink subframe 5 has implicit resources on the uplink subframe 2, the TPC element in the PDCCH on the downlink subframe 5 is used as a TPC command, and the HARQ-ACK is transmitted on the implicit resources of the downlink subframe 5 by using the PUCCH format 1 a/1b, as illustrated in FIG. 7.

Figure 8:
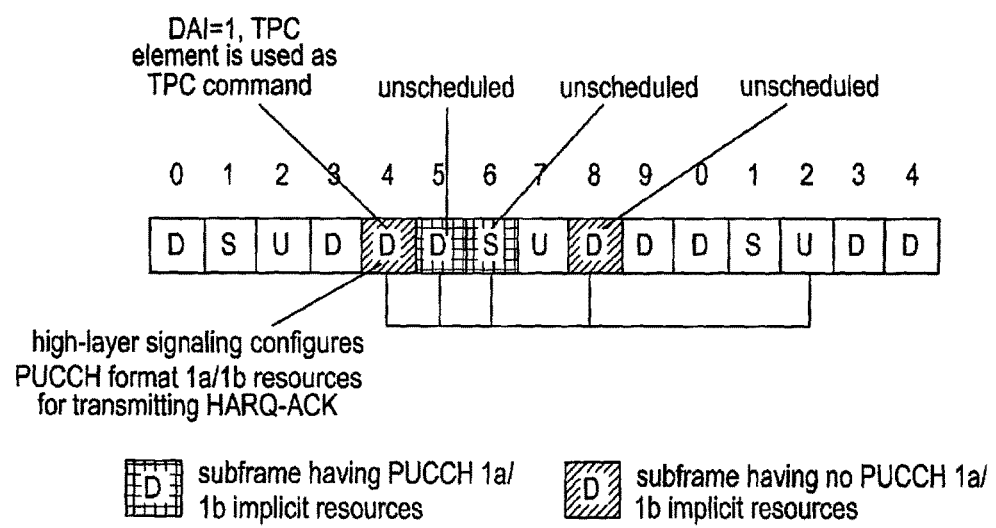
FIG. 8 illustrates a method for obtaining resources and a format used for HARQ-ACK transmission according to an embodiment of the present invention.

If the PDCCH scheduling the PDSCH is detected only on the downlink subframe 4 and the DAI in the PDCCH is equal to 1, according to the TDD uplink and downlink configuration 1 that does not support the dynamical traffic adaptive UE, the downlink subframe 4 has no implicit resources on the uplink subframe 2, the TPC element in the PDCCH on the downlink subframe 4 is used as a TPC command, and the HARQ-ACK is transmitted by using the PUCCH format 1a/1b on the PUCCH format 1a/1b resources obtained according to the high-layer signaling, as illustrated in FIG. 8.

In accordance with another embodiment of the present invention, the TPC element in the PDCCH on downlink subframes having implicit resources are used as a power control command of the PUCCH transmitting the HARQ- ACK, and the TPC element in the PDCCH on downlink subframes having no implicit resources are used as the ARIs, which indicate the PUCCH format 3 resources for transmitting the HARQ-ACK. Further, when the UE only receives the PDCCH having implicit resources, the UE transmits the HARQ-ACK on the implicit resources by using the PUCCH format 1b or PUCCH format 1a/1b with a channel selection. When the UE receives the PDCCH having no implicit resources, the UE transmits the HARQ-ACK by using the PUCCH format 3 on the PUCCH format 3 resources obtained according to the ARIs in the PDCCH.

The TDD uplink and downlink configuration 1 is indicated by the current system information obtained by the UE from the SIB1 and does not support the dynamic traffic adaptive UE, and the TDD uplink and downlink configuration 2 is used by the HARQ-ACK timing that is obtained by the UE through receiving the high-layer signaling and supports the dynamic traffic adaptive UE.

Figure 9:
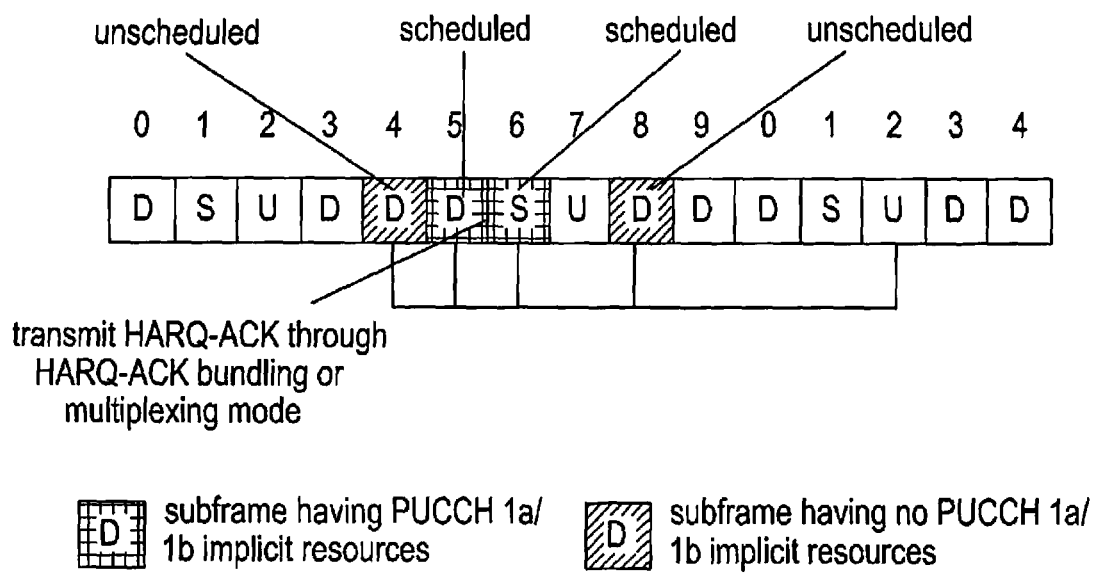
FIG. 9 illustrates a method for obtaining resources and a format used for HARQ-ACK transmission according to an embodiment of the present invention.

If the PDCCH scheduling the PDSCH is detected on the downlink subframes 5 and 6, according to the TDD uplink and downlink configuration 1 that does not support the dynamic traffic adaptive UE, the downlink subframes 5 and 6 have implicit resources on the uplink subframe 2, the TPC element in the PDCCH on the downlink subframes 5 and 6 are used as a TPC command, and the HARQ-ACK is transmitted on the implicit resources of the downlink subframes 5 and 6 by using the PUCCH format 1b with the channel selection, as illustrated in FIG. 9.

In accordance with another embodiment of the present invention, the TPC element in the PDCCH on the downlink subframes having implicit resources are used as a power control command of the PUCCH transmitting the HARQ-ACK, and the TPC element in the PDCCH on the downlink subframes having no implicit resources are used as the ARIs, which indicates the PUCCH format 1a/1b resources for transmitting the HARQ-ACK. Further, the UE transmits the HARQ-ACK by using the PUCCH format 1b with the channel selection on the implicit resources or the PUCCH format 1 a/1b resources obtained according to the ARIs in the PDCCH.

The TDD uplink and downlink configuration 1 is indicated by the current system information obtained by the UE from the SIB1 and does not support the dynamic traffic adaptive UE, and the TDD uplink and downlink configuration 2 is used by the HARQ-ACK timing that is obtained by the UE through receiving the high-layer signaling and supports the dynamic traffic adaptive UE.

Figure 10:
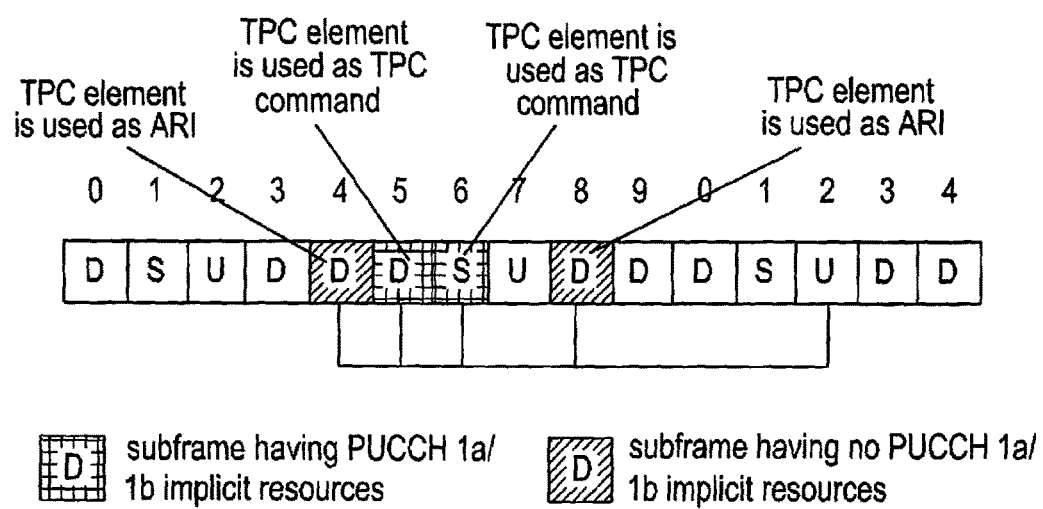
FIG. 10 illustrates a method for obtaining resources and a format used for HARQ-ACK transmission according to an embodiment of the present invention.

According to the TDD uplink and downlink configuration 1, which does not support the dynamic traffic adaptive UE, the downlink subframes 5 and 6 have implicit resources on the uplink subframe 2, and the TPC element in the PDCCH on the downlink subframes 5 and 6 are used as a TPC command. According to the TDD uplink and downlink configuration 1, which does not support the dynamical traffic adaptive UE, the downlink subframes 4 and 8 have no implicit resources on the uplink subframe 2, and the TPC element in the PDCCH on the downlink subframes 4 and 8 are used as the ARIs, which indicate the PUCCH format 1a/1b resources, as illustrated in FIG. 10.

In accordance with another embodiment of the present invention, the TPC element in the PDCCH on all downlink subframes in the bundling window are used as a power control command of the PUCCH transmitting the HARQ-ACK, the UE obtains PUCCH format 1a/1b resources for each subframe having no PUCCH format 1a/1b resources according to the high-layer signaling, and the UE transmits the HARQ-ACK by using the PUCCH format 1b with the channel selection on the implicit resources or the PUCCH format 1a/1b resources obtained according to the high-layer signaling.

The TDD uplink and downlink configuration 1 is indicated by the current system information obtained by the UE from the SIB1 and does not support the dynamic traffic adaptive UE, and the TDD uplink and downlink configuration 2 is used by the HARQ-ACK timing that is obtained by the UE through receiving the high-layer signaling and supports the dynamic traffic adaptive UE. The TPC element in the PDCCH on the downlink subframes 4, 5, 6, and 8 are used as a TPC command.

Figure 11:
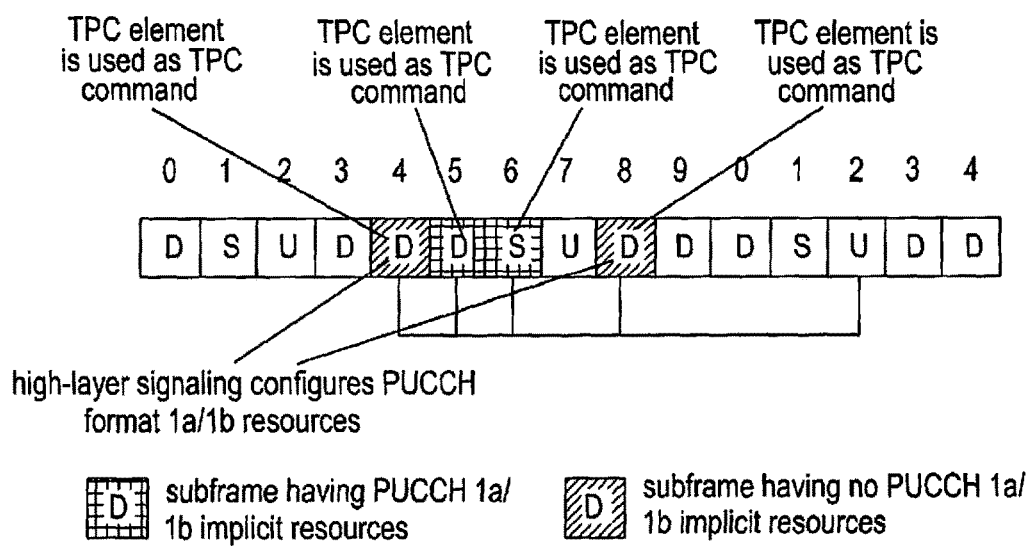
FIG. 11 illustrates a method for obtaining resources and a format used for HARQ-ACK transmission according to an embodiment of the present invention.

According to the TDD uplink and downlink configuration 1, which does not support the dynamic traffic adaptive UE, the downlink subframes 5 and 6 have implicit resources on the uplink subframe 2, the downlink subframes 4 and 8 have no implicit resources on the uplink subframe 2, and the UE obtains the PUCCH format 1a/1b resources of the subframes 4 and 8 according to the high-layer signaling, as illustrated in FIG. 11.

In accordance with another embodiment of the present invention, the TPC element in the PDCCH on all downlink subframes in the bundling window are used as the ARIs, which indicates the PUCCH format 1a/1b resources for transmitting the HARQ-ACK, and a power control command of PDCCH format 3/3A is used to implement the power control of the PUCCH transmitting the HARQ-ACK. Further, the UE transmits the HARQ-ACK by using the PUCCH format 1b with the channel selection on the PUCCH format 1a/1b resources obtained according to the ARIs in the PDCCH.

Figure 12:
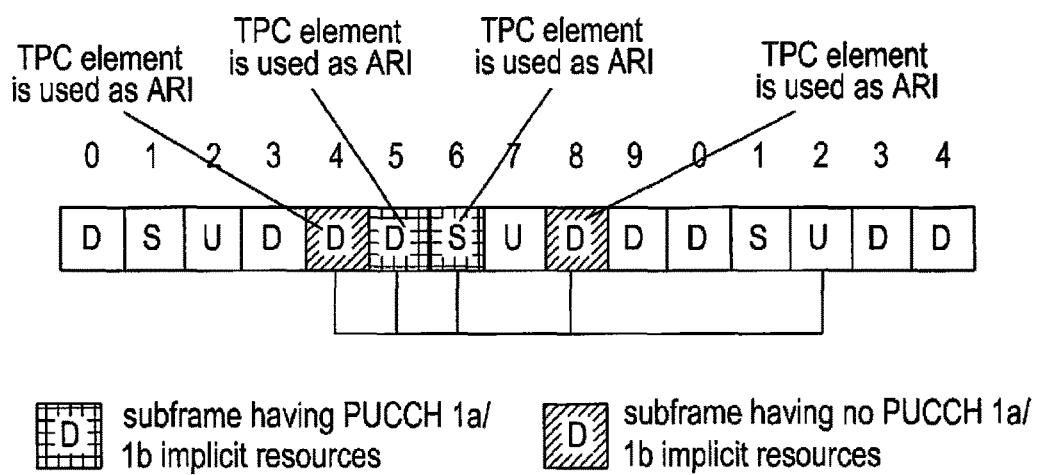
FIG. 12 illustrates a method for obtaining resources and a format used for HARQ-ACK transmission according to an embodiment of the present invention.

The TDD uplink and downlink configuration 1 is indicated by the current system information obtained by the UE from the SIB1 and does not support the dynamic traffic adaptive UE, and the TDD uplink and downlink configuration 2 is used by the HARQ-ACK timing that is obtained by the UE through receiving the high-layer signaling and supports the dynamic traffic adaptive UE. The TPC element in the PDCCH on the downlink subframes 4, 5, 6, and 8 are used as the ARIs, which indicates the PUCCH format 1a/1b resources. The UE transmits the HARQ-ACK by using the PUCCH format 1b with the channel selection on the PUCCH format 1a/1b resources obtained according to the ARIs in the PDCCH, and the power control command of PUCCH format 3/3A is used to implement the power control of the PUCCH transmitting the HARQ-ACK, as illustrated in FIG. 12.

In accordance with another embodiment of the present invention, the UE obtains the PUCCH format 3 resource corresponding to each bundling window through the high-layer signaling, and the TPC element in the PDCCH on all downlink subframes within each bundling window are used as a power control command of the PUCCH transmitting the HARQ-ACK. Further, when the UE only receives the PDCCH of downlink subframe whose DAI is equal to 1, and the downlink subframe has implicit resources, the UE transmits the HARQ-ACK on the implicit resources by using the PUCCH format 1a/1b. If the downlink subframe has no implicit resources, the UE transmits the HARQ-ACK by using the PUCCH format 3 on the PUCCH format 3 resources obtained according to the high-layer signaling. When the UE receives the PDCCH of downlink subframe whose DAI is unequal to 1, the UE transmits the HARQ-ACK by using the PUCCH format 3 on the PUCCH format 3 resources obtained according to the ARIs in the PDCCH.

In accordance with another embodiment of the present invention, the UE obtains the PUCCH format 3 resource corresponding to each bundling window through the high-layer signaling, and the TPC element in the PDCCH on the downlink subframes whose DAI is unequal to 1 are used as a power control command of the PUCCH transmitting the HARQ-ACK. Further, when the UE only receives the PDCCH of downlink subframe whose DAI is equal to 1, and the downlink subframe has implicit resources, the UE transmits the HARQ-ACK on the implicit resources by using the PUCCH format 1a/1b. If the downlink subframe has no implicit resources, the UE transmits the HARQ-ACK by using the PUCCH format 3 on the PUCCH format 3 resources obtained according to the high-layer signaling. When the UE receives the PDCCH of downlink subframe whose DAI is unequal to 1, the UE transmits the HARQ-ACK by using the PUCCH format 3 on the PUCCH format 3 resources obtained according to the ARIs in the PDCCH.

Figure 13:
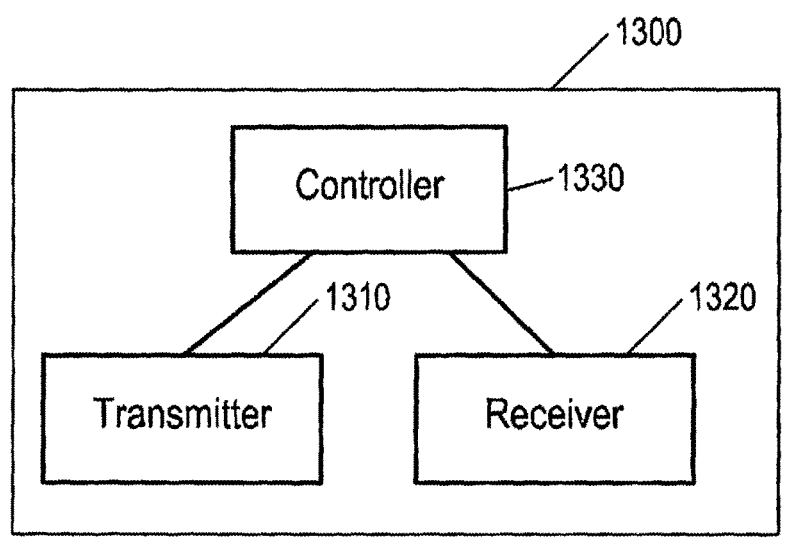
FIG. 13 illustrates a user equipment according to an embodiment of the present invention.

FIG. 13 illustrates a UE according to an embodiment of the present invention.

Referring to FIG. 13, the UE 1300 includes a transmitter 1310, a receiver 1320, and a controller 1330. The transmitter 1310 and the receiver 1320, respectively, include transmission circuitry and reception circuitry for communicating with a network entity such as a base station, under the control of the controller 1330.

The controller 1330 controls reception of HARQ-ACK feedback information by the receiver 1320, and transmission of the HARQ-ACK by the transmitter 1310.

Similarly, a base station may include a transmitter, a receiver, and a controller, and performing a reverse operation of the UE. Specifically, the controller generates the SIB according TDD uplink and downlink configuration, and controls HARQ-ACK timing. The transmitter of the base station transmits the SIB to the UE and the receiver receives HARQ-ACK from the UE.

As can be seen from the above described embodiments, a HARQ-ACK transmission method and apparatus in a traffic adaptive TDD system provide the PUCCH resource mapping methods and the methods of determining the PUCCH format used for HARQ-ACK transmission, thereby dynamically adjusting the assigned PUCCH resources according to actual uplink and downlink configuration when the uplink and downlink configuration changes dynamically. Further, the existing PUCCH resources can be fully utilized, thereby effectively saving the physical resources of uplink subframes.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

The invention claimed is:

1. A method for transmitting hybrid automatic repeat request-acknowledgement (HARQ-ACK) information by a user equipment (UE) in a time division duplexing (TDD) system, the method comprising:
    receiving control information including a downlink assignment index (DAI) and transmit power control (TPC) information on a downlink (DL) resource based on a TDD uplink (UL) and DL configuration obtained from system information;
    determining whether there is a first UL resource related to the DL resource and whether the DAI is equal to a predetermined value, the predetermined value indicating that the TPC information is used as a power control command for transmission of the HARQ-ACK information;
    if there is the first UL resource and the DAI is equal to the predetermined value, transmitting the HARQ-ACK information using a first physical uplink control channel (PUCCH) format on the first UL resource, the HARQ-ACK information being transmitted using power controlled based on the TPC information;
    if there is not the first UL resource and the DAI is equal to the predetermined value, transmitting the HARQ-ACK information using the first PUCCH format on a second UL resource obtained by a high-layer signaling, the HARQ-ACK information being transmitted using power controlled based on the TPC information; and
    if there is not the first UL resource and the DAI is unequal to the predetermined value, identifying a third UL resource indicated by the TPC information and transmitting the HARQ-ACK information using a second PUCCH format on the third UL resource.

2. The method of claim 1, wherein the TPC information is used as the power control command for transmission of the HARQ-ACK information using the first PUCCH format, if there is not the first UL resource and the DAI is equal to the predetermined value, and
    wherein the TPC information is used as a HARQ-ACK resource indicator (ARI) to indicate the third UL resource, if there is not the first UL resource and the DAI is unequal to the predetermined value.

3. The method of claim 1, wherein the first PUCCH format comprises a PUCCH format 1a/1b, and
    wherein the second PUCCH format comprises a PUCCH format 3.

4. The method of claim 1,
    wherein the first UL resource is identified based on a lowest control channel element (CCE) index of a physical downlink control channel (PDCCH) used for transmission of the control information.

5. A user equipment (UE) in a time division duplexing (TDD) system, the UE comprising:
    a transceiver configured to receive control information including a downlink assignment index (DAI) and transmit power control (TPC) information on a downlink (DL) resource based on a TDD uplink (UL) and DL configuration obtained from system information; and
    a processor configured to:
    determine whether there is a first UL resource related to the DL resource and whether the DAI is equal to a predetermined value, the predetermined value indicating that the TPC information is used as a power control command for transmission of hybrid automatic repeat request-acknowledgement (HARQ-ACK) information,
    if there is the first UL resource and the DAI is equal to the predetermined value, control the transceiver to transmit the HARQ-ACK information using a first physical uplink control channel (PUCCH) format on the first UL resource, the HARQ-ACK information being transmitted using power controlled based on the TPC information,
    if there is not the first UL resource and the DAI is equal to the predetermined value, control the transceiver to transmit the HARQ-ACK information using the first PUCCH format on a second UL resource obtained by a high-layer signaling, the HARQ-ACK information being transmitted using power controlled based on the TPC information, and if there is not the first UL resource and the DAI is unequal to the predetermined value, identify a third UL resource indicated by the TPC information, and control the transceiver to transmit the HARQ-ACK information using a second PUCCH format on the third UL resource.

6. The UE of claim 5, wherein the TPC information is used as the power control command for transmission of the HARQ-ACK information using the first PUCCH format, if there is not the first UL resource and the DAI is equal to the predetermined value, and wherein the TPC information is used as a HARQ-ACK resource indicator (ARI) to indicate the third UL resource, if there is not the first UL resource and the DAI is unequal to the predetermined value.

7. The UE of claim 5, wherein the first PUCCH format comprises a PUCCH format 1a/1b, and wherein the second PUCCH format comprises a PUCCH format 3.

8. The UE of claim 5, wherein the first UL resource is identified based on a lowest control channel element (CCE) index of a physical downlink control channel (PDCCH) used for transmission of the control information.

9. A method for receiving hybrid automatic repeat request-acknowledgement (HARQ-ACK) information by a base station (BS) in a time division duplexing (TDD) system, the method comprising:

transmitting, to a user equipment (UE), system information including a TDD uplink (UL) and downlink (DL) configuration;

transmitting, to the UE, control information including a downlink assignment index (DAI) and transmit power control (TPC) information on a DL resource based on the TDD UL and DL configuration;

if there is a first UL resource related to the DL resource and the DAI is equal to the predetermined value, receiving, from the UE, the HARQ-ACK information using a first physical uplink control channel (PUCCH) format on the first UL resource, the HARQ-ACK information being transmitted using power controlled based on the TPC information;

if there is not the first UL resource and the DAI is equal to the predetermined value, receiving, from the UE, the HARQ-ACK information using the first PUCCH format on a second UL resource obtained a high-layer signaling, the HARQ-ACK information being transmitted using power controlled based on the TPC information; and if there is not the first UL resource and the DAI is unequal to the predetermined value, receiving, from the UE, the HARQ-ACK information using a second PUCCH format on a third UL resource indicated by the TPC information, wherein the predetermined value indicates that the TPC information is used as a power control command for transmission of the HARQ-ACK information.

10. The method of claim 9, wherein the TPC information is used as the power control command for transmission of the HARQ-ACK information using the first PUCCH format, if there is not the first UL resource and the DAI is equal to the predetermined value, and wherein the TPC information is used as a HARQ-ACK resource indicator (ARI) to indicate the third UL resource, if there is not the first UL resource and the DAI is unequal to the predetermined value.

11. The method of claim 9, wherein the first PUCCH format comprises a PUCCH format 1a/1b, and wherein the second PUCCH format comprises a PUCCH format 3.

12. The method of claim 9, wherein the first UL resource is identified based on a lowest control channel element (CCE) index of a physical downlink control channel (PDCCH) used for transmission of the control information.

13. A base station (BS) in a time division duplexing (TDD) system, the BS comprising:

a transceiver; and a processor configured to control the transceiver to:

transmit, to a user equipment (UE), system information including a TDD uplink (UL) and downlink (DL) configuration, transmit, to the UE, the control information including a downlink assignment index (DAI) and transmit power control (TPC) information on a DL resource based on the TDD UL and DL configuration, if there is a first UL resource related to the DL resource and the DAI is equal to the predetermined value, receive, from the UE, hybrid automatic repeat request-acknowledgement (HARQ-ACK) information using a first physical uplink control channel (PUCCH) format on the first UL resource, the HARQ-ACK information being transmitted using power controlled based on the TPC information, if there is not the first UL resource and the DAI is equal to the predetermined value, receive, from the UE, the HARQ-ACK information using the first PUCCH format on a second UL resource obtained by a high-layer signaling, the HARQ-ACK information being transmitted using power controlled based on the TPC information, and if there is not the first UL resource and the DAI is unequal to the predetermined value, receive, from the UE, the HARQ-ACK information using a second PUCCH format on a third UL resource indicated by the TPC information, wherein the predetermined value indicates that the TPC information is used as a power control command for transmission of the HARQ-ACK information.

14. The BS of claim 13, wherein the TPC information is used as the power control command for transmission of the HARQ-ACK information using the first PUCCH format, if there is not the first UL resource and the DAI is equal to the predetermined value, and wherein the TPC information is used as a HARQ-ACK resource indicator (ARI) to indicate the third UL resource, if there is not the first UL resource and the DAI is unequal to the predetermined value.

15. The BS of claim 13, wherein the first PUCCH format comprises a PUCCH format 1a/1b, and wherein the second PUCCH format comprises a PUCCH format 3.

16. The BS of claim 13, wherein the first UL resource is identified based on a lowest control channel element (CCE) index of a physical downlink control channel (PDCCH) used for transmission of the control information.

* * * * *